Aug. 1, 1933.  C. H. NORTON  1,920,209
LATHE AND METHOD OF TURNING ROUND BODIES
Filed April 17, 1931   2 Sheets-Sheet 1
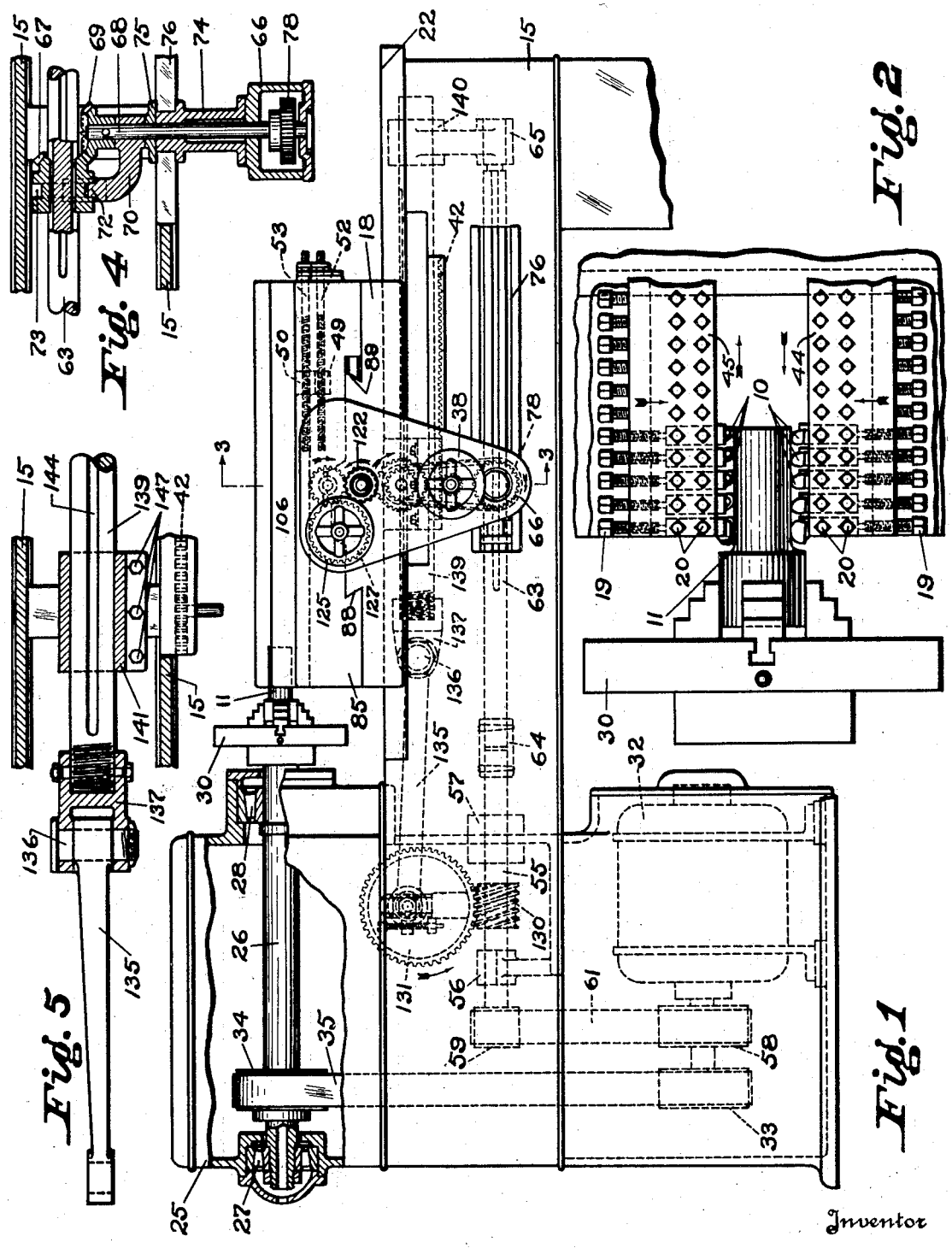
Witnesses
Franklin E. Johnson
Edward H. Goodrich
Inventor
Charles H. Norton
By
Clayton L. Jenks
Attorney

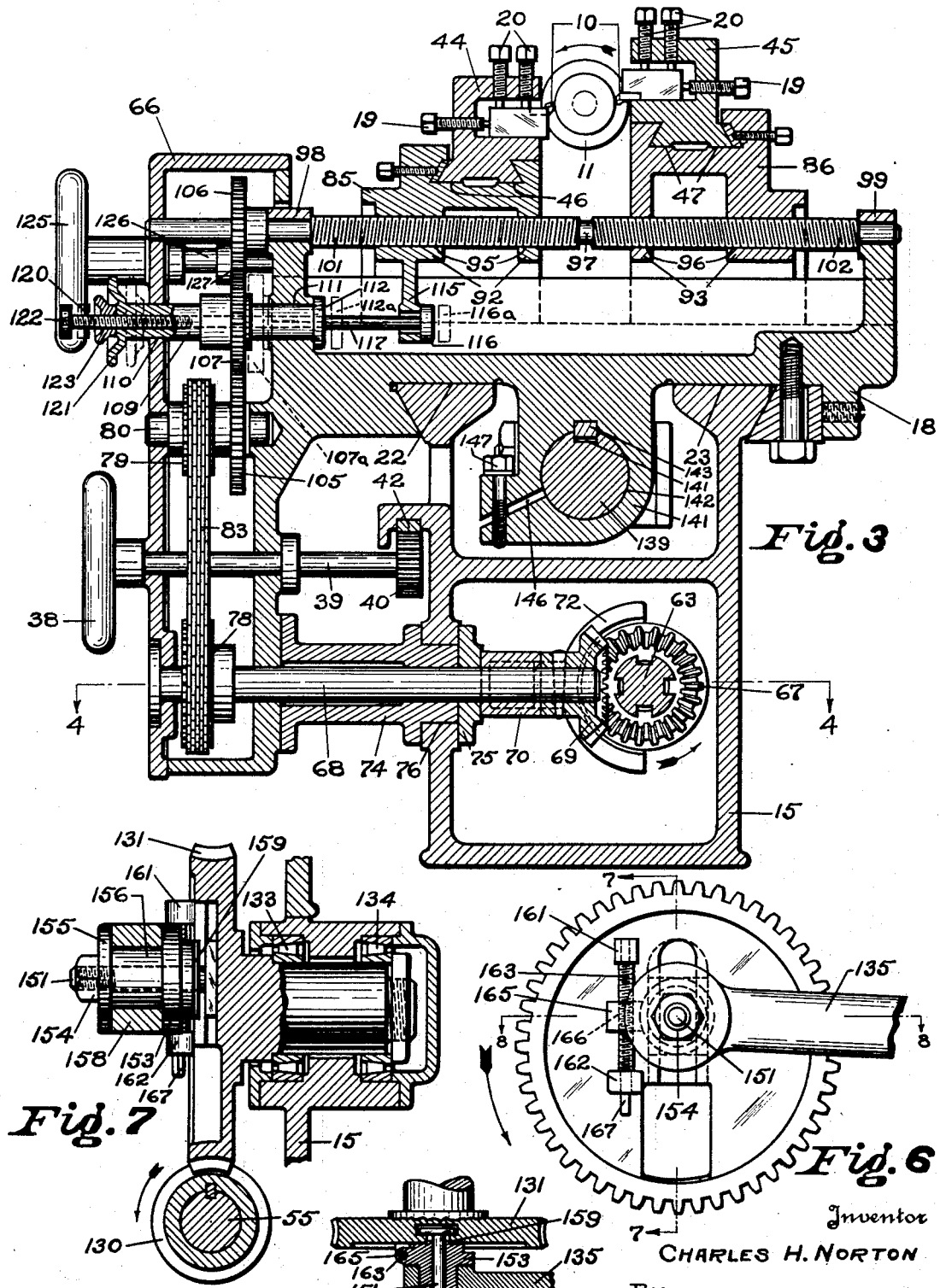

Patented Aug. 1, 1933

1,920,209

UNITED STATES PATENT OFFICE 1,920,209

LATHE AND METHOD OF TURNING ROUND BODIES

Charles H. Norton, Plainville, Conn., assignor to Norton Company, Worcester, Mass., a Corporation of Massachusetts Application April 17, 1931. Serial No. 530,798

15 Claims. (Cl. 82—2.)

This invention relates to a method of cutting or turning round objects and to a lathe capable of cutting at the same time substantially the entire length of that portion of the work which is to be reduced in size.

For many years, it has been the accustomed method to remove stock in a lathe turning operation by slowly traversing one or more lathe tools along the entire length of a rotating work piece while in operative engagement therewith and thereby cutting stock from the work in an overlapping helical path. In such lathe turning operations the lathe tools have been intermittently fed into the work by a small amount just prior to each cutting stroke and said tools maintained in a fixed relation to the axis of the rotating work during the tool traverse. It has also been common practice in the usual lathe turning operation to remove stock from a rotating work piece by taking heavy hogging cuts slowly to shave most of the stock from the work and to then readjust the tool feed and take several light surface smoothing cuts to further reduce the work piece to the desired size and finish. During recent years, considerable improvement has been attained in the lathe tools themselves, and more rugged and tougher tools have been produced capable of taking heavier cuts and which tools may be utilized to take deeper hogging cuts at a much faster rate than has been formerly possible.

However, it has been found that many of the work pieces turned in a lathe will not withstand the heavy cuts within the capabilities of many of the late lathe tool developments, hence the full efficiency of the tools may not be attained and as a result considerable time may be lost in many production turning operations, thereby increasing the cost of the finished work. Today, the demands for precision workmanship are so great that even the smoothest finish formerly obtained by the most careful lathe turning and polishing methods is insufficient to meet the exacting requirements of much of the modern high speed machinery. Hence, a large percentage of the work formerly finished by lathes is now ground in a grinding machine as a final finishing operation to supplement a previous lathe turning operation and thereby provide the exact size and finish to the work piece. There is, therefore, much demand and necessity in this day of highly specialized mass production and competitive manufacturing costs for an automatic lathe capable of removing stock from rotating work at a heretofore unknown rapid rate of speed whereby the production of successive duplicate work pieces may be greatly increased at a much lower cost.

It is therefore the primary object of my invention to provide a novel method of rapidly shaping rotative round work pieces which will insure a maximum removal of stock within a given time and thereby utilize the full capabilities of the present day high speed cutting tools whereby the expense of lathe turning may be materially reduced.

It is a further object of my invention to provide a lathe construction capable of carrying out this method of cutting and which will reduce the size of the work throughout substantially its entire extent at the same time and which will serve efficiently and economically for turning round work pieces.

In accordance with my invention, I have provided a lathe capable of presenting a multiplicity of lathe tools in simultaneous and rapid cutting engagement with a rapidly rotating work piece. Instead of slowly traversing my lathe tools along the work in cutting engagement therewith and intermittently feeding the tools into the work prior to each cutting stroke as has been the former practice, I preferably mount my lathe tools in spaced relation along the entire length of that portion of the work to be reduced, and rapidly and continuously feed all of the tools and the rotating work relatively towards each other at such a rate as to take a series of continuous light shallow cuts at a high cutting speed. To facilitate a rapid cutting action and simultaneously reduce the entire work surface, all of the lathe tools and the work are rapidly oscillated relative to each other longitudinally of the work axis during the continuous relative infeed movement and through a distance just sufficient to cause their cutting paths to overlap in non-recurring paths. In the preferred construction, the lathe tools are both oscillated and fed forward into the work. The rotation of my work as well as the infeed and oscillatory movements of my lathe tools are so timed relative to each other that the extent of tool travel during a single oscillation is not exactly divisible into the peripheral distance around the work, hence for many rotations of the work each lathe tool will cut a non-repeating path which frequently intersects adjacent tool paths and cuts across its previous path during a continuous infeed movement of the lathe tools thereby utilizing the full capabilities of the modern high speed cutting tools and removing stock from a rotative work piece in a very small fraction of the time which would be required to accomplish the same operation by any previous type of lathe cutting operations. For such a high speed cutting tool I preferably utilize the recently developed cutting metals, such as the tungsten carbide-nickel alloy or other suitable alloys capable of taking cuts at a high rate of speed. In using such a tool, it is desirable to feed it into the work at such a rate relative to the speed of rotation of the work that a shallow cut is taken under a pressure which is exceedingly light as compared with the capability of the tool metal when cutting deeply at a slow rate.

Formerly, it has been the common practice in most lathe turning operations to present the tools to the work only from one side of the work. This has tended to spring the work pieces, especially when turning long and slender work, thereby causing an uneven turning action and occasionally creating sufficient inaccuracies to spoil the work pieces. My machine has completely overcome this difficulty and also provided a much faster cutting method since I have provided two sets of lathe tools which are arranged to engage opposite sides of the work and are simultaneously fed into the work at the same rate thereby counteracting their cutting pressures without tending to distort the work. These two sets of cutting tools are mounted upon a carriage which is oscillated continuously during a continuous infeed of all of the tools thereby providing very rapid means of reducing a work piece without making an attempt to obtain a smooth surface.

A major portion of the work finished in lathes is now subjected to a further operation of grinding to produce work of the exact size and finish desired. Therefore, a further feature of my invention resides in the fact that it is not my intention to use my lathe to cut a smooth, highly polished, cylindrical surface, since doing so with a lathe necessitates an extremely slow rate of traverse and a light cut with the lathe tool along the work surface and thereby multiplies the length of time required to pass the tool over the work and reduce it to size. A grinding wheel is very efficient in removing stock from a rough surface. I have found that I can produce a piece of finished cylindrical work much more efficiently and in far less time than that usually required in the present well known methods, by first rapidly removing stock in a lathe and purposely leaving a rough surface on the work and then grinding the rough surface to the required size and finish in a grinding machine.

One type of my machine capable of accomplishing my method of removing stock from and rapidly shaping rotating work has been illustrated in the accompanying drawings, in which like reference numerals indicate like parts:

Fig. 1 is a front elevation of a lathe embodying my invention;

Fig. 2 is a fragmentary plan view showing a plurality of lathe tools in position to cut the work;

Fig. 3 is a sectional view taken along the line 3—3 of Fig. 1;

Fig. 4 is a fragmentary sectional view taken along the line 4—4 of Fig. 3;

Figs. 5, 6, 7 and 8 are fragmentary views showing various parts of the tool carriage oscillating mechanism.

In accordance with my invention as illustrated in the accompanying drawings, I have provided a novel method of lathe turning wherein a multiplicity of lathe tools 10 as shown in Figs. 2 and 3 are fixedly spaced along the entire length of a work piece 11 and preferably on opposite sides thereof. My machine also is provided with automatic mechanism whereby all of the lathe tools may be simultaneously and continuously fed toward the work axis as well as an adjustable device wherein the tools may be oscillated longitudinally of the work from zero to any required extent during their infeeding movement. As illustrated in the drawings the work is assumed to rotate in the direction indicated by arrow $a$. The lathe tools 10 are each provided with cutting noses so shaped that they may be simultaneously fed into the work and reciprocated or oscillated longitudinally thereof through a short distance sufficient to cause their adjacent cutting paths to overlap and at such a rate that they travel in non-recurring paths, whereby the entire work piece may be rapidly reduced simultaneously throughout its entire length by a so-called plunge cut feeding operation of the tools into the work. For example, if the distance between two adjacent cutting paths were one inch, I would rapidly oscillate all of my cutting tools at least one inch and preferably slightly in excess thereof during the continuous infeed of the lathe tools, thereby rapidly reducing the work without attempting to leave a smooth finished surface since the work must necessarily be subjected to a finish grinding operation.

As illustrated in the drawings, my lathe comprises a base 15 supporting spaced lathe tools 10 upon a slidable carriage 18 by means of adjusting and clamping screws 19 and 20. The carriage 18 is slidably mounted on the base 15 upon ways 22 and 23 longitudinally thereof. The base also supports a headstock 25 provided with a rotatable spindle 26 supported in suitable bearings 27 and 28 in the headstock frame. The spindle 26 is provided with a work supporting chuck 30 arranged to hold the work piece 11 in correct rotative position for a lathe turning operation. It will be understood, of course, that the chuck 30 may be replaced with any conventional type of work center and a tailstock supporting a work center may be affixed to the ways 22 and 23 for rotatably supporting long work pieces, such as a shaft, whenever desired. The spindle 26 may be rotated by any suitable source of power, such as, for example, a motor 32 mounted within the base 15. The motor is provided with a driving pulley 33 upon its armature shaft which serves to rotate a driven pulley 34 upon shaft 26 by means of a connecting belt 35 thereby serving to positively rotate the work piece 11 at a fixed rate.

The tool carriage 18 may be slidably positioned relative to the work 11 by means of a hand wheel 38 affixed to a shaft 39 journaled within the tool carriage 18 and provided with a pinion 40 constantly enmeshed with a rack 42 secured to the base 15. Thus it will be apparent that any rotation imparted to the hand wheel 38 will cause a corresponding rotation of shaft 39 and pinion 40 fixed thereto, thereby causing the pinion to roll upon the stationary rack 42 and the tool carriage 18 to slide upon the supporting ways 22 and 23 either towards or from the work piece 11 in a direction parallel to the axis of said work piece.

In the particular construction illustrated, a plurality of lathe tools 10 are arranged in spaced relation and secured in gang formation upon opposite sides of the work by the individual positioning and clamping screws 19 and 20. Each gang of tools is individually and adjustably mounted upon the carriage 18 so that it may be slidably positioned as a unit upon the carriage by movement longitudinally of the work. This is accomplished by securing the two gangs of tools to support members 44 and 45 respectively by means of the locating and clamping screws 19 and 20. These support members 44 and 45 are slidably mounted within ways 46 and 47 respectively within the carriage 18. To move the gangs of tools relative to each other and relative to the tool carriage, I have provided the members 44 and 45 with depending lugs 49 and 50 (Fig. 1) which are engaged by adjusting screws 52 and 53 respectively threaded therein and rotatably secured to the tool carriage 18. It will be apparent that by turning these adjusting screws 52 and 53, the tool gangs may be readily adjusted relative to each other so that the opposed tool noses may be aligned or staggered as desired.

My lathe is also provided with a feeding mechanism which serves to continuously feed all of the cutting tools into the work at a predetermined rate acting in timed relation to the work rotation. This is accomplished by providing a shaft 55 journaled within bearings 56 and 57 secured to the base 15. The motor 32 is also provided with a driving pulley 58 which is fixed to its armature shaft and serves to rotate shaft 55 by means of pulley 59 affixed thereto and the belt 61 connecting said pulleys. The shaft 55 is connected to drive a splined shaft 63 by means of a coupling 64. The other end of the splined shaft 63 is journaled within a bearing 65 supported by the base of the machine. To transmit power from the splined shaft 63 a bevel gear 67 is slidably mounted upon the splined shaft so that it may be moved therealong while in constant driving engagement therewith. The front of the carriage 18 is provided with an apron or gear housing 66 within which are journaled various gears which serve to transmit a continuous infeed movement to the lathe tools during the turning operation. A shaft 68 mounted for rotation within the lower part of the apron 66 is driven by a bevel pinion 69 pinned thereto and maintained in constant driving engagement with bevel gear 67 by means of a member 70 which is rotatably supported upon the shaft 68 and serves to position bevel gear 67 by means of a yoke 72 which rotatably engages a groove 73 within said bevel gear 67, thereby always maintaining it in correct rolling engagement with the bevel pinion 69. The shaft 68 is also supported by two bearing members 74 and 75 which slidably engage a slot 76 within the base 15, thereby helping to rigidly position shaft 68 in correct position relative to splined shaft 63 during the rotation of said shaft. The forward end of shaft 68 within the apron 66 is provided with a sprocket 78 fastened thereto and arranged to transmit rotary motion to a sprocket 79 mounted for rotation with a shaft 80 journaled within the apron and driven by a chain or link belt 83 connecting said sprockets. The support members 44 and 45, each of which serve to hold a gang of lathe tools 10, are in turn mounted within cross slide members 85 and 86 slidably secured within dovetailed ways 88 and 89 on the carriage 18 transverse of the work axis whereby said tool gangs may be moved toward and from the work axis.

To simultaneously feed all of the lathe tools 10 into the rotating work piece 11, I have provided the cross slide members 85 and 86 with depending portions 92 and 93 respectively, said depending portions being provided with threaded holes 95 and 96, arranged to receive a feed screw 97 rotatably mounted within the carriage 18 and supported by bearings 98 and 99 and provided with left- and right-hand threaded portions 101 and 102 which mate with the threaded holes 95 and 96 respectively. Thus any rotation imparted to the feed screw 97 will cause the cross slide members 85 and 86 to simultaneously move in opposite directions and feed the lathe tool either toward or from the rotating work piece 11. To continuously rotate the feed screw 97, I have connected it by a gear train to the power driven sprocket 79 mounted upon shaft 80 which is journaled in the apron 66. This is accomplished by providing a gear 105 upon shaft 80 and fixed to rotate with sprocket 79 also upon said shaft. A gear 106 is pinned upon the outer end of the screw 97 within the apron 66 and connected to rotate in the same direction as gear 105 by means of an idler gear 107 intermeshed with both of said gears 105 and 106. It will therefore be apparent from the drawings and the foregoing explanation that the motor 32 serves to simultaneously rotate work piece 11 and continuously feed the cutting tools 10 towards the work axis.

I have also provided a simple means whereby the lathe tools may be power fed into the work for a predetermined distance so that each successive work piece may be automatically reduced to a required size. To simply and easily accomplish this, I have fixedly mounted the idler gear 107 upon a sleeve member 109 which is slidably journaled within bearings 110 and 111 in the apron 66 and provided with a flanged portion 112 at its rearward end arranged to engage bearing 111 and thereby limit the forward sliding motion of the idler gear 107. When sleeve 109 is pushed rearwardly, the idler gear 107 will be slid out of mesh with the mating gears 105 and 106 to such a position as indicated in dotted lines as 107a, in which location no power will be transmitted to rotate the feed screw 97 and feed the lathe tool into the work. The cross slide member 85 has been further provided with a depending member 115 which serves to engage an enlarged portion or head 116 upon the rear end of a rod 117 adjustably located within the sleeve 109 whereby a sufficient infeed movement of the cross slide 85 may serve to slide gear 107 out of engagement to position 107a and thereby terminate the infeed movement of the cutting tool. To adjust the position of the head 116 and rod 117 relative to the sleeve 109, I preferably provide the rod 117 with a threaded portion 120 upon its outer end which is threaded within the hole in said sleeve 109. The threaded portion 120 of the rod 117 is sufficiently long to extend out a short distance beyond a hand wheel 121 formed on the forward end of sleeve 109 and is also provided with a handle 122 upon its forward end whereby the rod may be screwed into and out of the sleeve 109 to correctly position the head 116 relative to the depending arm 115 upon the cross slide 85. A hand nut 123 is screw threaded upon the threaded portion 120 of the adjustable rod 117 adjacent to the hand wheel 121 and may be tightened thereagainst to lock the rod 117 in position after adjustment thereof. It will therefore be apparent that when the lathe tools 10 have been power fed into the work a predetermined amount, the head 116 has been engaged and moved to a position indicated at 116a, flange 112 has been moved away from bearing 111 to position 112a and the idler gear 107 has been disengaged from a driving position to position 107a. It will also be apparent that when the tools have been sufficiently withdrawn from the work, idler gear 107 can be returned to operative position by pulling out on either of the hand wheels 122 or 123, thereby bringing idler gear 107 again into operative engagement with gears 105 and 106.

It is occasionally desirable to manually feed the cutting tools into the work. To accomplish this, I manually shift idler gear 107 to its inoperative position 107a by pushing in on either of the hand wheels 122 or 123, thus disengaging the power feed connection. The feed screw 97 may then be manually operated by rotating hand wheel 125 which is fastened to a shaft 126 extending through and journaled within the upper part of apron 66. The shaft 126 also carries a gear 127 affixed thereto which is constantly enmeshed with gear 106 upon the feed screw 97. Thus any rotary motion imparted to hand wheel 125 serves to rotate gears 127 and 106, thereby rotating the feed screw 97 and moving all of the cutting tools simultaneously into or out of the work as desired.

To facilitate a simultaneous reduction of the entire work piece, I provide a power driven oscillating motion for all of the lathe tools longitudinally of the work so that the adjacent cutting paths of the tools 10 will be caused to overlap during continuous infeed of the tools into the work. I have provided an easily adjustable rapid oscillatory motion for my lathe tools which may be regulated from zero to a considerable extent depending upon the relative positions of the adjacent lathe tools and the type of cutting noses utilized thereon. A worm 130 fixedly mounted on the power driven shaft 55 is maintained in constant driving engagement with a worm wheel 131 which is rotatably mounted within bearings 133 and 134 secured to the base of the machine. The worm wheel is provided with an adjustable mount whereby one end of a link member 135 may be pivotally and eccentrically mounted thereon. The other end of the link 135 is pivotally connected by a pin 136 to a yoke 137 fastened to a rod 139 adjustably secured to the carriage 18 and slidably journaled within a bearing 140 in the base whereby the carriage may be oscillated to an extent determined by the eccentric movement of the link 135 pivotally fixed to the worm wheel 131 and rotatable therewith.

To transmit the oscillatory movement of rod 139 to carriage 18 and thereby oscillate the tools 10 along the work, I have provided the carriage 18 with a depending member 141 adapted to slidably engage the rod 139 within a hole 142 in said depending member and aligned with the rod 139. I also provide a key 143 secured within the depending member 141 and arranged to slidably engage within a keyway 144 in the rod 139 to prevent any rotary movement of said rod within hole 142. A slit 146 is cut within the depending member 141 and a clamping means comprising screws 147 is arranged to engage said depending member 141 upon each side of said slit 146 whereby the hole 142 may be decreased in diameter and the depending member 141 will clamp firmly about the rod 139 whereby any longitudinal motion transmitted to said rod will impart the same movement to the carriage 18 along the supporting ways 22 and 23. Whenever the operator wishes to reposition the carriage 18 longitudinally of the work, it is simply necessary to first loosen the tension upon screws 147 permitting a relative sliding motion between the rod 139 and member 141 whereupon the carriage 18 may be easily traversed by rotating hand wheel 38.

The adjustment for the oscillating motion of the lathe tools as shown in Figs. 6, 7 and 8 comprises a diametrically located T-shaped slot within the worm wheel 131 arranged to slidably receive a T-head bolt 151. A sleeve 153 fits over the T-head bolt 151 and is clamped against the face of the worm wheel 131 by means of a nut 154 and a washer 155. Sleeve 153 is also provided with a reduced bearing portion 156 adjacent to its outer end which serves to rotatably support and journal the flange head 158 upon the driving end of the link 135. To prevent rotation of the sleeve 153 relative to the worm wheel 131, I have provided a flat faced throated portion 159 thereon which engages the entering side faces of the T-slot 150. It will thus be apparent that by loosening nut 154 on the T-bolt 151, the T-bolt and assembled parts thereon may be moved diametrically of worm wheel 131 and clamped in any desired position so that the eccentric movement of sleeve 153 may through the cooperation of link 135 and rod 139 transmit an oscillatory movement to the carriage 18 and tools 10, which movement may be varied from zero to a considerable extent depending upon the distance the T-bolt is radially moved from the axis of the worm wheel 131. To facilitate the adjustment of T-bolt 151, I have provided two lugs 161 and 162 extending from the face of worm wheel 130, which are arranged to rotatably support a screw 163 therebetween. The sleeve 153 is also provided with an extending lug 165 which has a threaded hole 166 adapted to receive the screw 163 and be moved thereby. One end of the screw 163 is so shaped that it may be easily turned and in the present case comprises a square shank 167. It will therefore be apparent that nut 154 may be loosened and screw 163 turned to gradually adjust sleeve 153 to the desired position, whereupon it may again be locked in adjusted position by nut 154.

The operation of my machine is believed readily apparent from the foregoing disclosure. It is simply necessary that the operator mount a work piece 11 within chuck 30 and start motor 32 which is connected to simultaneously rotate the work, feed the tools continuously into the work to a predetermined position and also oscillate the tools longitudinally of the work through a predetermined but adjustable distance. Upon completion of the turning operation, the operator stops motor 32, withdraws the tools 10 from the work by turning hand wheel 125 and again engages the power feed by pulling out on either of the hand wheels 122 or 123 whereupon he may replace the finished work piece with another work blank if it is to be automatically reduced to the same size. If the tools 10 have been set sufficiently close so that their cutting edges or noses engage the entire surface of the work the oscillating motion of the carriage 18 may be adjusted to zero by moving the T-bolt 151 and sleeve 153 to be non-eccentric and lie upon the axis of worm gear 131. To adjust the power feed so that it will disengage wherever desired, it is simply necessary to manually move the lathe tools to the position at which it is desired the power feed be disengaged and then adjust the threaded rod 117 within sleeve 109 to such a position that gear 107 has been moved to position 107a while the head 116 on rod 117 is engaged by member 115 depending from cross slide 85. To move the carriage 18 relative to rod 139 which serves to impart a power driven oscillatory motion thereto, it is simply necessary to loosen clamping screws 147 whereupon the carriage may be slid along ways 22 and 23 by hand wheel 38.

It is therefore apparent that I have provided a fast cutting lathe which may be quickly adapted to accommodate various types of work and which will rapidly duplicate a cutting operation upon successive work pieces by continuously and rapidly feeding a gang of cutting tools into a rapidly rotating work piece a predetermined distance. It will also be apparent that I have provided a method of turning which may be carried out on various types of machines by suitable modifications of their structure and modes of operation.

By designing my machine to take a multiplicity of light overlapping cuts at a very rapid rate, I have caused the operation of the machine to more nearly approach the conditions encountered in the efficient operation of a precision grinding machine wherein an infinite number of small abrasive cutting edges in the grinding wheel cut successive minute overlapping paths across the work surface. In such an action, each abrasive particle in the grinding wheel does but a small amount of work by itself. However, the total amount of work done by all of these minute abrasive particles in a given time may result in a considerable removal of stock from the work. In accordance with my lathe turning method, I have provided a large number of cutting edges each of which serves to simultaneously remove a small amount of stock at a very rapid rate. By causing the cutting edge or nose of each tool to take a light rapid cut I thus tend to keep the tools from getting quickly dulled and cause them to have a much longer and more useful cutting life.

Having thus described my invention, what I claim as new and desire to secure by Letters Patent is:

1. The method of machining rotating work pieces comprising the steps of rapidly rotating the work, continuously feeding towards the work axis a plurality of lathe tools arranged along the work, and during the feeding movement causing a relative oscillation of the lathe tools and work through a given distance, regardless of the length of the work, which will cause the paths cut by the tools to overlap each other.

2. The method of machining rotating work pieces comprising the steps of rapidly rotating the work, continuously feeding towards the work axis a plurality of lathe tools arranged along the work, rapidly and simultaneously oscillating all of the lathe tools longitudinally of the work and in timed relation to the work rotation at such a rate that for several rotations of the work the tools are limited to cut non-repeating paths which progressively intersect with adjacent cutting paths.

3. The method of turning an article comprising the steps of rotating the work at a rapid rate and cutting it with a multiplicity of high speed lathe tools arranged along the work while continuously and simultaneously feeding the tools directly into the work at such a rate as to take a succession of shallow cuts under a light pressure as compared with the capabilities of the tools when cutting at a slow rate, and oscillating said tools at a rapid rate longitudinally of the work while in cutting engagement therewith through a sufficient distance to cause the cutting paths of the tools to overlap.

4. The method of machining rotating work pieces of various sizes and lengths comprising the steps of simultaneously feeding into the work a multiplicity of spaced lathe tools of such a number and arrangement as determined by their cutting width that the work is cut throughout its entire length at the same time and reduced to the same approximate size, and simultaneously oscillating the work and tools relatively through a distance as great as the width of the space between two adjacent cutting paths and thereby causing the paths to overlap.

5. The method of machining rotating work pieces of various sizes comprising the steps of simultaneously and automatically feeding into a rotatably driven work piece a multiplicity of spaced lathe tools arranged along substantially the entire work length, oscillating the work and tools relatively and longitudinally of the work during their infeed movement to such an extent as to cause adjacent tool paths to overlap, and maintaining the rate of oscillation in such timed relation to the work rotation that each cutting tool will be caused to cut a non-repeating path, whereby the entire work piece may be rapidly reduced in diameter.

6. A lathe comprising a rotatable work support, means to rapidly rotate the support, lathe tools spaced along substantially the entire length of the portion of the work to be cut, means for relatively oscillating the work and said lathe tools to a sufficient extent to cause each tool to overlap the cutting paths of the adjacent tools to reduce the entire work surface, and means to feed the tools and work relatively towards each other during the cutting operation.

7. A lathe comprising a rotatable work support, means to rapidly rotate said support, a plurality of spaced cutting tools mounted for engagement with the work along substantially the entire length of the portion to be cut, means to simultaneously feed said cutting tools into the work at a uniform rate, and means to cause a rapid, relatively short oscillation between the cutting tools and the work to cause overlapping of their adjacent cutting paths and reduce the entire work surface.

8. A lathe comprising a rotatable work support, means to rapidly rotate said support, a plurality of spaced lathe tools arranged to engage the work throughout a considerable portion of its length, means to continuously feed said tools into the work at a constant rate, means to cause a rapid relative oscillation between the tools and the work, and means to adjust the extent of said oscillation whereby each tool cut may overlap the cut of an adjacent tool.

9. A lathe comprising a rotatable work support, means to rotate the support, a tool carriage having a plurality of spaced cutting tools mounted thereon for engaging the work along substantially the entire length of the portion to be cut, means to feed the tools into the work continuously, and means acting in timed relation with the work rotation for causing a relatively short and rapid oscillation between the tools and the work which insures that the tools travel through non-recurring paths for a plurality of work rotations.

10. A lathe comprising a rotatable work support, means to rotate said work support at a rapid rate, a tool carriage mounted for movement towards and from the work axis and for oscillation lengthwise thereof, a plurality of cutting tools rigidly and adjustably fixed upon said tool carriage and shaped to cut the work along its entire length when oscillated longitudinally of the work axis, means to continuously feed the cutting tools into the work, and means to rapidly oscillate the carriage and tools lengthwise of the work during the infeed of the tools.

11. A lathe comprising a rotatable work support, means to rotate said work support at a high rate of speed, a plurality of spaced high speed cutting tools arranged to cut the work along its entire extent, a carriage therefor mounted for oscillation parallel to the work axis, means to rapidly oscillate the carriage, adjustable mechanism arranged to control the extent of carriage oscillation whereby the cutting paths of the tools may be caused to overlap each other, and means to continuously feed the cutting tools into the work and towards the work axis during said oscillation of the carriage.

12. A lathe comprising a rotatable work support, means to rapidly rotate said support, a multiplicity of lathe tools spaced along substantially the entire length of that portion of the work to be cut, means to continuously feed all of the lathe tools simultaneously into the work piece during its rotation, mechanism for causing a continuous relative oscillation between the lathe tools and the work longitudinally of the work during the tool infeed and in timed relation with the work rotation, and means to adjust said oscillatory movement whereby the tool cutting paths may be caused to overlap.

13. A lathe comprising a rotatable work support, means to rapidly rotate said support, a multiplicity of lathe tools spaced along substantially the entire length of that portion of the work to be cut and on opposite sides thereof, power operated means to continuously feed all of the tools into the work, an adjustable device to disengage the power operated tool feed when the work has been reduced to a predetermined size, and mechanism for relatively oscillating the work and the lathe tools longitudinally of the work during the infeed of the tools to a sufficient extent to overlap their adjacent cutting paths.

14. A lathe comprising a rotatable work support, means to rapidly rotate said support, a tool carriage movable towards and from the work parallel to the work axis, a group of lathe tools on each side of the work mounted in spaced relation upon said tool carriage, means to move each group of tools as a unit longitudinally of the work and relative to the tool carriage whereby the opposed tool noses may be positioned relative to each other, means to simultaneously feed all of the lathe tools into the work, and means to rapidly oscillate the carriage and all of the tools thereon longitudinally of the work during their infeed through a distance just sufficient to cause a progressive overlapping of the adjacent cutting paths.

15. A lathe comprising a base, a rotatable work support thereon, means to rapidly rotate said support, a tool carriage movable on the base and longitudinally of the work, a multiplicity of lathe tools mounted in spaced relation on said carriage and substantially along the entire length of the portion of the work to be cut and on opposite sides thereof, power operated mechanism to continuously feed all of the tools simultaneously into the work, means operated in timed relation with the work rotation to cause a rapid oscillation of the carriage and lathe tools longitudinally of the work during the engagement of the tools with the work, means to adjust the extent of said oscillation whereby each tool will be caused to cut a non-recurring path which may progressively intersect with adjacent cut paths, and adjustable mechanism to disengage the power operated tool infeed when the work has been reduced to a predetermined size.

CHARLES H. NORTON.